United States Patent
Li et al.

(10) Patent No.: US 12,147,916 B1
(45) Date of Patent: Nov. 19, 2024

(54) MULTI-CLASSIFICATION AND PREDICTION METHOD FOR ELECTRICAL SIGNAL OF AIRCRAFT SMALL SAMPLE BASED ON NAIVE BAYES

(71) Applicant: Beihang University, Beijing (CN)

(72) Inventors: Ke Li, Beijing (CN); Donghao Wang, Beijing (CN); Pengjiao Li, Beijing (CN); Haopeng Wu, Beijing (CN); Yan Kan, Beijing (CN); Liping Pang, Beijing (CN); Shunkun Yang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/630,728

(22) Filed: Apr. 9, 2024

(30) Foreign Application Priority Data

Jun. 9, 2023 (CN) .......................... 202310687009.3

(51) Int. Cl.
*G06N 7/01* (2023.01)
*G06F 18/2415* (2023.01)

(52) U.S. Cl.
CPC .......... *G06N 7/01* (2023.01); *G06F 18/24155* (2023.01)

(58) Field of Classification Search
CPC ....................................................... G06N 7/01
See application file for complete search history.

(56) References Cited

U.S. PATENT DOCUMENTS

| | | | |
|---|---|---|---|
| 2020/0391881 A1* | 12/2020 | Elshrif | G06N 20/00 |
| 2021/0300528 A1* | 9/2021 | Howell | B64C 13/505 |
| 2022/0111852 A1* | 4/2022 | Harris | B60W 40/02 |
| 2022/0205870 A1* | 6/2022 | Howell | G06N 20/00 |
| 2022/0415190 A1* | 12/2022 | Borgyos | G08G 5/0069 |
| 2023/0033178 A1* | 2/2023 | Wiegman | G01C 21/20 |
| 2023/0057311 A1* | 2/2023 | Moeykens | G08G 5/0052 |
| 2023/0058992 A1* | 2/2023 | Moeykens | G06F 21/31 |
| 2024/0062166 A1* | 2/2024 | List | G06Q 10/087 |

FOREIGN PATENT DOCUMENTS

CN 108872984 A * 11/2018 ............. G01S 13/90

* cited by examiner

*Primary Examiner* — Shelley Chen
(74) *Attorney, Agent, or Firm* — Hoffmann & Baron, LLP

(57) ABSTRACT

The present disclosure relates to a multi-classification non-intrusive identification and detection method for an electrical signal based on naive Bayes, including an expert database module and a signal classification module. An electrical signal training sample of a known category is built based on historical and real-time aircraft signals. Classification is performed based on a built naive Bayes model classifier, to obtain an aircraft signal classification result. P(yi) is separately calculated for each category, a conditional probability is calculated for each feature, and a classification result of a sample signal is obtained through statistic acquisition by using a probability comparison algorithm. A next status is predicted by using a time series prediction method after electrical signal data is classified and determined by using a naive Bayes algorithm.

3 Claims, 3 Drawing Sheets

MULTI-CLASSIFICATION AND PREDICTION METHOD FOR ELECTRICAL SIGNAL OF AIRCRAFT SMALL SAMPLE BASED ON NAIVE BAYES

CROSS REFERENCE TO RELATED APPLICATION

This patent application claims the benefit and priority of Chinese Patent Application No. 202310687009.3, filed with the China National Intellectual Property Administration on Jun. 9, 2023, the disclosure of which is incorporated by reference herein in its entirety as part of the present application.

TECHNICAL FIELD

The present disclosure provides a method for classifying and predicting an electrical signal of an aircraft small sample.

BACKGROUND

Aircraft signal identification and classification are a core of an aircraft health management policy. By determining a current health status of a complex system, causes and sources of faults are found effectively, and a series of suggestions or decisions related to maintenance and guarantee are put forward. The aircraft health management policy is widely recognized and applied in the aerospace industry field, provides great guarantee for safety and reliability of a spacecraft, and will become an inevitable trend of aerospace industry development.

A conventional machine learning algorithm in an aircraft signal identification and classification method lacks a feature extraction capability for high-dimensional data. Aircraft signal classification problems include a small sample problem, a classification accuracy problem, a classification speed problem, and the like.

SUMMARY

To resolve a problem that there is a limitation in signal scale identification in an existing method for classifying and identifying an aircraft signal, the present disclosure provides multi-classification for an electrical signal based on naive Bayes and a prediction method based on a time series analysis model, which effectively resolves problems that a shallow-layer feature is extracted, a gradient disappears, and a feature scale is single, thereby significantly improving accuracy of classifying and predicting an aircraft signal.

In the present disclosure, a time series prediction method is used to monitor a load electrical signal of a spacecraft power supply system. A next status is predicted by using the time series prediction method after electrical signal data is classified and determined by using a naive Bayes algorithm. The next status is compared with that in a standard database formed by using known sample data that is correctly classified, to determine a possible fault signal.

Therefore, the present disclosure relates to a naive Bayes algorithm and the prediction method based on the time series analysis model.

DETAILED DESCRIPTION OF THE EMBODIMENTS

Figure 1:
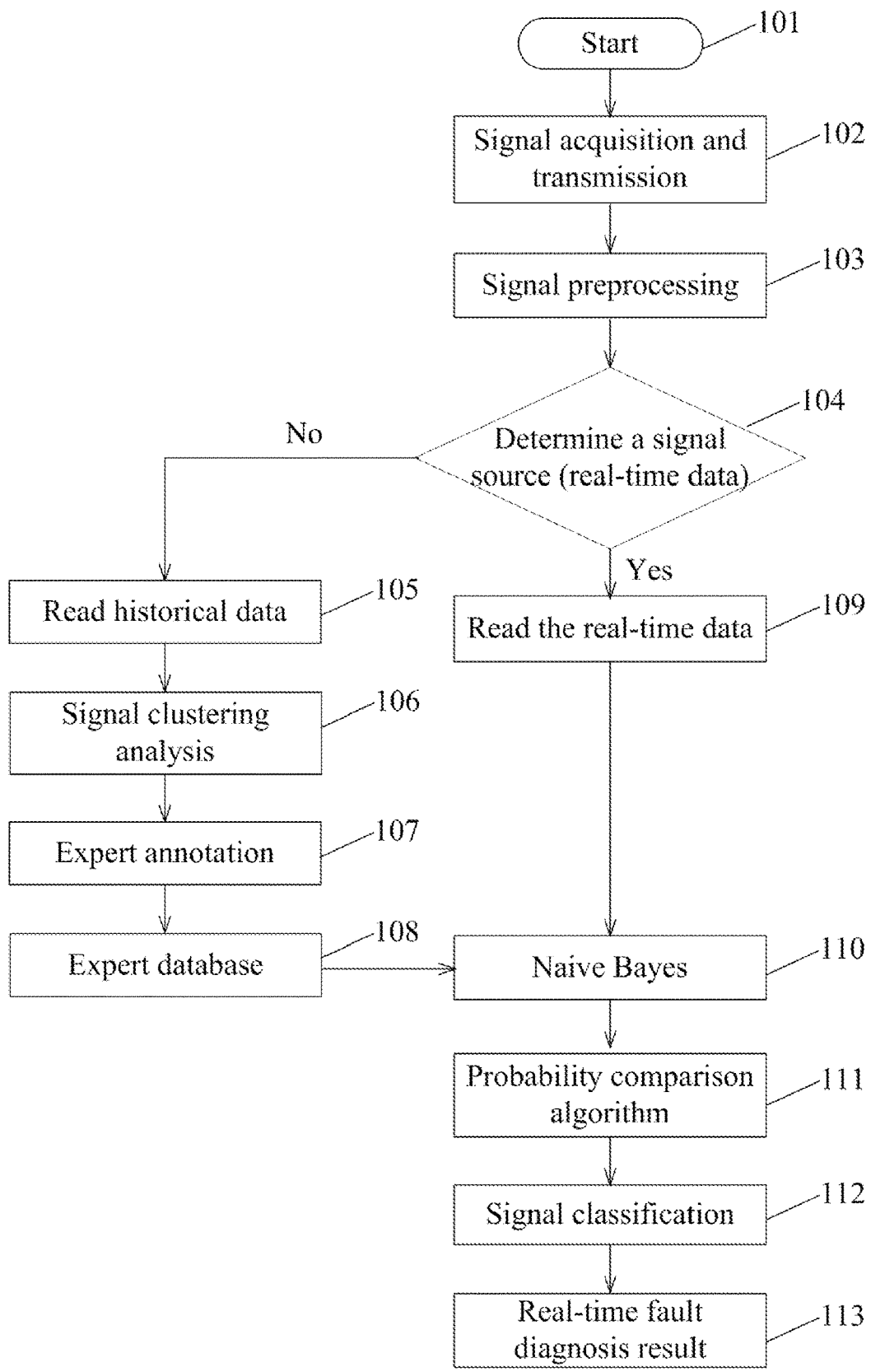
FIG. 1 is a flowchart of a method for classifying and identifying an aircraft small sample signal based on naive Bayes according to an embodiment of the present disclosure.
Figure 2:
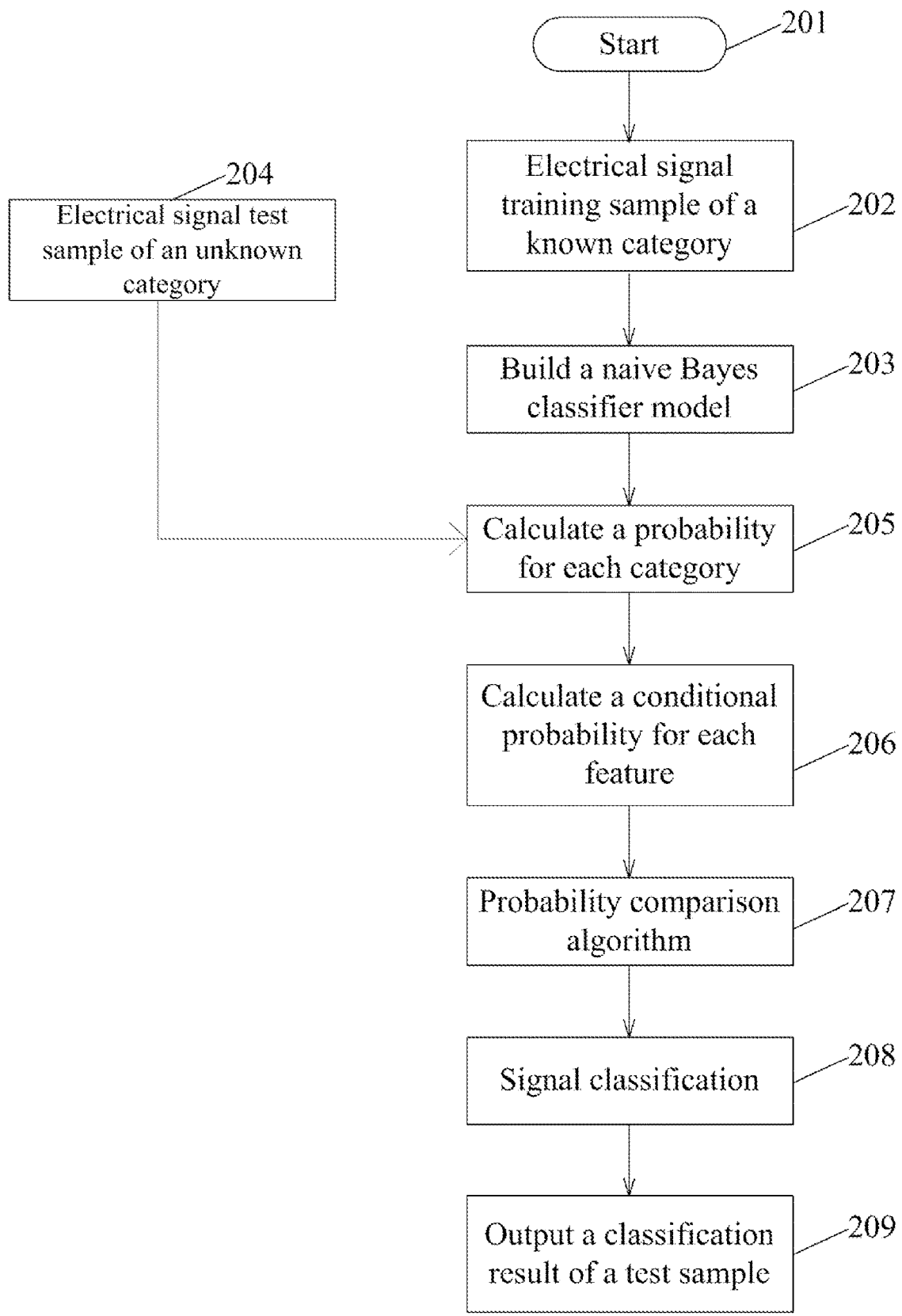
FIG. 2 is a flowchart of a naive Bayes classification module according to an embodiment of the present disclosure.
Figure 3:
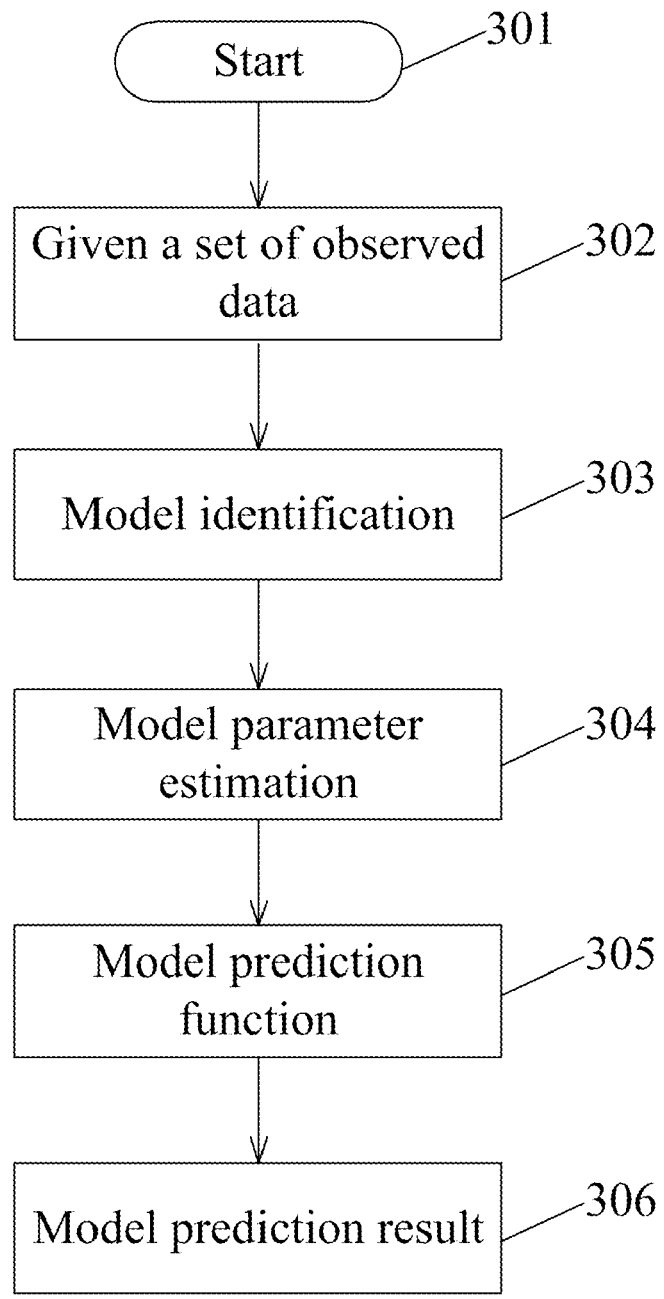
FIG. 3 is a flowchart of a prediction module of a time series analysis model according to an embodiment of the present disclosure.

According to an embodiment of the present disclosure, a flowchart of a method for classifying and identifying an aircraft small sample signal based on naive Bayes is shown in FIG. 1. The method includes the following.

When it is necessary to perform fault determining on an aircraft signal (101), a data signal of a complex device in an aircraft is acquired and transmitted to a sensor (102), and signal preprocessing is performed on an original signal obtained by the sensor (103). A determining procedure is performed to determine a signal source (104). If the signal source is historical data, a historical data reading step (105) is entered, signal clustering analysis is performed on the data (106), expert annotation work is effectively assisted (107), and the historical data and annotation corresponding to the historical data are built into an expert database (108). If the signal source is real-time data, a real-time data reading step (109) is entered. Both the historical data and the real-time data are input to a naive Bayes algorithm (110), and are classified by using the Bayes algorithm. A calculation result is sent to a probability comparison algorithm (111), to obtain a classification result of an aircraft signal (112), and output a real-time fault diagnosis result (113).

A probability model classifier is a conditional probability model. An independent category variable C has several categories, and conditions depend on several characteristic variables $F_1, \ldots, F_n$. However, there is a problem that if a feature quantity n is large or each feature may take a large quantity of values, it becomes unrealistic to list a probability table based on the probability model. In this case, this model is modified to make the model feasible. The Bayes theorem has the following formula:

$$P(C \mid F_1, \ldots, F_n) = \frac{P(C)P(C \mid F_1, \ldots, F_n)}{P(F_1, \ldots, F_n)} \tag{1}$$

An independent distribution feature model is a naive Bayes probability model. A naive Bayes classifier includes this model and a corresponding decision rule. According to different classification decision rules, Bayes classification has many forms: a minimum error rate Bayes classifier, a maximum likelihood ratio Bayes classifier, and a minimum risk Bayes classifier.

A common rule is to select a most likely one, that is, to classify a to-be-classified sample into a category with a largest posterior probability. This is a maximum a posteriori (MAP) probability decision rule. A true classifier is referred to as an MAP probability classifier, and is equivalent to the minimum error rate Bayes classifier. When the MAP probability decision is used, the classification error probability takes a minimum value. A corresponding classifier is a classification formula defined as follows:

$$\text{classify}(f_1, \ldots, f_n) = \underset{c}{\operatorname{argmax}} p(C = c) \prod_{i=1}^{n} p(F_i = f_i \mid C = c) \tag{2}$$

C represents a type of event, and F represents a feature of an electrical signal. The classification result is that when it is assumed that each feature is independent, a maximum probability is selected after a conditional probability is calculated. A least absolute error (LAE) method is used when a probability of each feature is calculated, that is, an error between a feature of an electrical signal event and a feature of a standard event is calculated, a magnitude of the error is converted to a probability belonging to a category, and a larger ratio of the error to a standard indicates a smaller probability. A threshold of the probability may be set, for example, the probability is not less than 10%.

$$P=1-E/F_S=1-(F-F_S)/F_S \qquad (3)$$

In the foregoing formula, E represents an error, F represents a feature of an electrical signal event, and $F_S$ represents a feature of a standard event.

The present disclosure relates to multi-classification non-intrusive identification and detection method for an electrical signal based on naive Bayes, including an expert database module and a signal classification module. An electrical signal training sample of a known category is built based on historical and real-time aircraft signals (202). Feature extraction is performed based on a built naive Bayes model classifier (203), and an aircraft signal classification result is obtained (112) by using a probability comparison algorithm (111). Specifically, a probability is separately calculated for each category (205), a conditional probability is calculated for each feature (206), and a classification result of a sample signal is obtained (208) through statistic acquisition by using a probability comparison algorithm (207). A next status is predicted by using a time series prediction method after electrical signal data is classified and determined by using a naive Bayes algorithm (306). The method effectively resolves problems that a shallow-layer feature is extracted, a gradient disappears, a feature scale is single, and so on, thereby significantly improving accuracy of classifying and identifying an aircraft multi-scale signal.

In the present disclosure, a time series prediction method is used to monitor a load electrical signal of a spacecraft power supply system. The next status is predicted by using the time series prediction method after the electrical signal data is classified and determined by using the naive Bayes algorithm. The next status is compared with that in a standard database formed by using known sample data that is correctly classified, to determine a possible fault signal. A time series is a feature data series that changes with time. The load electrical signal of the spacecraft power supply system is a data set based on the time series. Time series analysis is to explore, based on current and past observed values of known signal data, all implicit information included in the data, and observe and estimate a value or a change trend of the data in a future period of time. For a given set of observed values $[y_i, (x_{1i}, x_{2i}, \ldots, x_{pi})]$, where i=1, 2, . . . , N, $y_i$ represents a predicted value, and $x_{ji}$ represents a sample observed value. A relationship between the predicted value and the observed value may be expressed by using the following formula:

$$y_i=\beta_1 x_{1i}+\beta_2 x_{2i}+ \ldots +\beta_p x_{pi}+\varepsilon_i \qquad (4), \text{where}$$

$\varepsilon_i$ represents a random variable whose average value is zero. The sample observed value $x_{ji}$ is a determined current or historical data information. The predicted value); is mainly determined by the random variable $\varepsilon_i$. This model is referred to as a static model.

After the formula (4) is transformed, a new linear model may be obtained, which may be used to describe some time series $\{x_i\}$:

$$x_i=\varphi_1 x_{i-1}+\varphi_2 x_{i-2}+ \ldots +\varphi_p x_{i-p}+\alpha_i (p<N) \qquad (5)$$

In the formula, $\alpha_i$ is a white noise sequence, and p is an order. $\{x_i\}$ and $\{x_{i-j}\}$ represent statuses of $\{x_i\}$ at different times. This model is referred to as a dynamic model.

The model (5) is referred to as an autoregressive model. Described is a relationship between an observed value of the series $\{x_i\}$ at a specific moment and a previous status. A linear combination of an observed value at a current status and historical data is used to represent the time series $\{x_i\}$, and in this case, $$x_i=\alpha_i-\theta_1\alpha_{i-1}-\theta_2\alpha_{i-2}- \ldots -\theta_q\alpha_{i-q} \qquad (6)$$

The model (6) is referred to as a sliding average model, and q is an order. $\theta_i$ is a sliding average coefficient or a parameter of the model. Both P and q represent orders of the model.

A time series analysis model may be obtained by combining the model (5) and the model (6), as shown in the following formula:

$$x_i=\varphi_1 x_{i-1}+\varphi_2 x_{i-2}+ \ldots +\varphi_p x_{i-p}+\alpha_i-\theta_1\alpha_{i-1}-\theta_2\alpha_{i-2}- \ldots -\theta_q\alpha_{i-q} \qquad (7)$$

A model is identified and built by using known available historical observed data. This is a key step in establishing a time series model. For the time series $\{x_i\}$, there are two important data quantity statistics features, which are mainly used to preliminarily determine, according to the statistical features of the time series, whether the series is suitable for a prediction model. One is an autocorrelation coefficient, and the other is a partial correlation coefficient. In addition, the two data quantity features may be further used to determine an order of the model.

Let $\{x_i\}$ be a group of sample observed values of the time series. A sample autocovariance function is as follows:

$$r_k = \frac{1}{n}\sum_{i=1}^{n-k} x_i x_{i+k} \qquad (8)$$

A sample autocorrelation function is defined as follows:

$$\rho_k = \frac{\sum_{i=1}^{N-k}(x_i-\bar{x})(x_{i+k}-\bar{x})}{\sum_{i=1}^{N}(x_i-\bar{x})^2} \qquad (9)$$

A partial correlation function is defined as follows:

$$\begin{cases} \eta_{11} = \rho_1 & (k=1) \\ \eta_{kk} = \dfrac{\rho_k - \sum_{j=1}^{k-1}\eta_{k-1,j}\rho_{k-j}}{1 - \sum_{j=1}^{k-1}\eta_{k-1,j}\rho_{k-j}} & (k=2,3\ldots) \\ \eta_{k,j} = \eta_{k-1,j} - \eta_{k,k}\eta_{k-1,k-1} & (k=2,3,\ldots,j<k) \end{cases} \qquad (10)$$

For the time series analysis model: A sample $\{x_i\}$ is known, and an estimated value of an autocovariance $\gamma_k$ of $\{x_i\}$ is obtained. According to the following formula:

$$\begin{bmatrix} \gamma_{q+1} \\ \gamma_{q+2} \\ \vdots \\ \gamma_{q+p} \end{bmatrix} = \begin{bmatrix} \gamma_q & \gamma_{q+1} & \cdots & \gamma_{q-p-1} \\ \gamma_{q+1} & \gamma_q & \cdots & \gamma_{q-p-2} \\ \vdots & \vdots & \ddots & \vdots \\ \gamma_{q+p-2} & \gamma_{q+p-2} & \cdots & \gamma_q \end{bmatrix} \begin{bmatrix} \varphi_1 \\ \varphi_2 \\ \vdots \\ \varphi_p \end{bmatrix} \quad (11)$$

$\varphi=\varphi_1, \varphi_2, \ldots, \varphi_p$ is obtained, and is substituted back to the model as an estimated value of a regression coefficient. Therefore, all estimated parameters can be obtained.

An observed value sequence $\{x_t\}$ is used to predict a status value $x_{t+1}(l>1)$ of a t+1 moment at a moment t. A predicted value is denoted as $x_t(l)$. A conditional expectation of $x_{t+1}$ is used as a predicted value of $x_{t+1}$, that is, $$x_t(l)=E((x_{t+l}|x_t,x_{t-1},x_{t-2},\ldots)) \quad (12)$$

Because $x_{t+1}=\varphi_1 x_{t+l-1}+\varphi_2 x_{t+l-2}+\ldots+\varphi_p x_{t+l-p}$, a predicted value can be obtained.

$$x_t(l)=\varphi_1 x_t(l-1)+\varphi_1 x_t(l-2)+\ldots+\varphi_{l-1}x_t(1)+\varphi_l x_t+\ldots+\varphi_n x_{t+l-p} \quad (13)$$

A set of observed data acquired based on the time series is given, to estimate an observation status in a next period of time. First, model identification, namely, model selection is performed according to a data feature. Then, parameter estimation is performed on a selected model. Finally, the model is checked. After going through the foregoing steps, the model may be used to predict a future status. A specific procedure is as follows: Observed data acquired based on the time series is input (302) to perform model identification. Whether the model is applicable is determined by calculating an autocorrelation coefficient and a partial correlation coefficient (303). A model parameter is estimated (304). A model prediction function (305) is built. A predicted result in a future period of time is output (306).

The present disclosure includes the following advantages and beneficial effects:

(1) The method for identifying and classifying an aircraft small sample signal has good robustness and universality.

(2) Compared with a conventional method, a naive Bayes method has stable classification efficiency, has a relatively low sensitivity to missing data, and meets an application condition of the small sample signal. This method significantly improves accuracy of classifying and identifying the aircraft signal.

(3) A model prediction method is proposed, making an outstanding contribution to core fault detection of an aircraft health management policy.

What is claimed is:

1. A method for classifying and identifying an aircraft small sample signal based on naive Bayes, comprising:

(A3) determining a signal source (104);

if the signal source is historical data, entering a historical data reading step (105), performing signal clustering analysis on the data (106), effectively assisting expert annotation work (107), and building the historical data and annotation corresponding to the historical data into an expert database (108); or if the signal source is real-time data, entering a real-time data reading step (109);

(A4) inputting both the historical data and the real-time data into a naive Bayes classification module (110), and calculating a conditional probability by using a Bayes algorithm;

(A5) sending a calculation result to a probability comparison algorithm classifier (111), and obtaining a classification result of an aircraft signal (112); and (A6) outputting a real-time fault diagnosis result (113), wherein the naive Bayes classification module is a conditional probability model, and adopts a maximum a posteriori (MAP) probability decision, that is, a classification error probability takes a minimum value, and a corresponding classifier is a classification formula defined as follows:

$$\text{classify}(f_1, \ldots, f_n) = \arg\max_c p(C=c)\prod_{i=1}^{n} p(F_i=f_i|C=c), \quad (2)$$

wherein

C represents a category variable, c represents a specific category, F represents a characteristic variable of an electrical signal, f represents a specific feature, n represents a summation upper limit, p(C=c) represents a probability of a c category, p(Fi=fi|C=c) represents a conditional probability, and the classification result of the aircraft signal is that when it is assumed that each feature is independent, a maximum probability is selected after the conditional probability is calculated; and operations of the naive Bayes classification module comprise:

(B1) building an electrical signal of a known category based on a historical aircraft signal and a real-time aircraft signal, and training a sample (202);

(B2) performing feature extraction based on a built naive Bayes model classifier (203);

(B3) obtaining the classification result of the aircraft signal (112) by using the probability comparison algorithm (111), which comprises:

(B31) separately calculating a probability for each category (205);

(B32) calculating a conditional probability for each feature (206); and (B33) obtaining a classification result of a sample signal (208) through statistic acquisition by using the probability comparison algorithm (207); and (B4) pre-determining a next status by using a time series prediction method after electrical signal data is classified and determined by using the naive Bayes algorithm (306), which comprises:

(B41) inputting observed data acquired based on a time series to perform model identification (302);

(B42) determining whether the model is applicable by calculating an autocorrelation coefficient and a partial correlation coefficient (303);

(B43) estimating a model parameter (304);

(B44) building a model prediction function (305); and (B45) outputting a prediction result in a future period of time (306).

2. The method for classifying and identifying an aircraft small sample signal based on naive Bayes according to claim 1, wherein before step A3, the method further comprises the following steps:

(A1) acquiring a data signal of a complex device in an aircraft by using a sensor (103); and (A2) performing signal preprocessing on an original signal obtained by the sensor (103).

3. The method for classifying and identifying an aircraft small sample signal based on naive Bayes according to claim 1, wherein in step A6, a least absolute error (LAE) method is used when a probability of each feature is calculated, that is, an error between a feature of an electrical signal event and a feature of a standard event is calculated, a magnitude of the error is converted to a probability belonging to a category, and a larger ratio of the error to a standard indicates a smaller probability.

* * * * *